(12) United States Patent
Nagai et al.

(10) Patent No.: US 6,687,071 B2
(45) Date of Patent: Feb. 3, 2004

(54) MAGNETIC TAPE DRIVE APPARATUS AND MAGNETIC HEAD CLEANING METHOD

(75) Inventors: Nobuyuki Nagai, Kanagawa (JP); Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 09/733,465

(22) Filed: Dec. 8, 2000

(65) Prior Publication Data

US 2001/0040748 A1 Nov. 15, 2001

(30) Foreign Application Priority Data

Dec. 10, 1999 (JP) .......................................... P11-351360

(51) Int. Cl.[7] .......................... G11B 5/09; G11B 15/18; G11B 27/36
(52) U.S. Cl. .............................. 360/53; 360/69; 360/31; 324/210
(58) Field of Search ........................... 360/53, 128, 25, 360/31, 69; 324/210, 212

(56) References Cited

U.S. PATENT DOCUMENTS 5,253,126 A * 10/1993 Richmond ................... 360/53
5,973,892 A * 10/1999 Hasegawa et al. .......... 360/128
6,215,618 B1 * 4/2001 Anderson et al. ........... 360/128
6,411,083 B1 * 6/2002 Inaba ......................... 324/210

* cited by examiner

*Primary Examiner*—Regina N. Holder
(74) *Attorney, Agent, or Firm*—Sonnenschein, Nath & Rosenthal LLP

(57) ABSTRACT

A magnetic tape drive apparatus in which data are recorded/reproduced on/from a magnetic tape by recording/reproducing magnetic heads which are disposed on a head drum and moved on a circular locus comprising cleaning device for removing deposit such as stain adhering to a magnetic head to clean the magnetic head, error rate detection device for detecting the error rate of the magnetic tape when data are recorded/reproduced onto/from the magnetic tape, and error rate storage device for storing the error rate detected by the error rate detection device, wherein the error rate detected by the error rate detection device exceeds a reference error rate by a predetermined amount, the magnetic head is cleaned by the cleaning device.

9 Claims, 2 Drawing Sheets

MAGNETIC TAPE DRIVE APPARATUS AND MAGNETIC HEAD CLEANING METHOD

BACKGROUND OF THE INVENTION

1. Field of the Invention

The present invention relates to a technique of effectively removing deposit such as stain which adhere to a magnetic head disposed on a head drum so as to move along a circular locus in a magnetic tape drive apparatus.

2. Description of the Related Art

In a magnetic tape drive apparatus such as a video tape recorder (hereinafter referred to as "VTR") for performing a recording/reproducing operation on a magnetic tape with a recording/reproducing magnetic head which is disposed on a head drum and moves along a circular locus, plural recording/reproducing magnetic heads (hereinafter referred to as "recording/reproducing heads") are secured to the head drum, and they scan the surface of a magnetic tape fed from a supply reel side to a take-up reel side at a predetermined speed while being moved due to the rotation of the head drum.

Since the recording/reproducing heads are brought into contact with the surface of the magnetic tape in the recording/reproducing operation, there is such a problem that they are deposited with magnetic powder falling off the magnetic tape, dust, etc. and also with depositions which have been formed as a result of thermal denaturing of the above things and then deposition onto the recording/reproducing heads (hereinafter referred to as "stain"), resulting in deterioration of electromagnetic conversion characteristic.

In general, the deposit of the recording/reproducing heads is removed by using head cleaning means such as a so-called head cleaning roller to thereby prevent the electromagnetic conversion characteristic from being deteriorated.

Recently, following increase of an information amount to be handled, the recording density has been required to be enhanced, and thus it has been indispensable for recording/reproducing heads to use a so-called MR head having higher detection sensitivity than a so-called inductive head.

However, the MR head generally has a lower allowable range to abrasion, and this abrasion problem is getting more critical than ever in such a device as VTR in which a magnetic tape and a recording/reproducing head are brought into contact with each other at all times. Accordingly, it promotes abrasion itself to frequently clean a recording/reproducing head using an MR head with cleaning means.

Therefore, there has been proposed a magnetic tape drive apparatus in which an error rate of a magnetic tape is detected and recording/reproducing heads are cleaned with cleaning means when the error rate thus detected is worse (larger) than a predetermined value. In this magnetic tape drive apparatus, the error rate as a reference value is fixed and unvaried. Therefore, for example when a magnetic tape or the like which has originally a worse (larger) error rate is used, the recording/reproducing heads are frequently cleaned although they are not deposited, so that the abrasion of the recording/reproducing heads is promoted.

SUMMARY OF THE INVENTION

The present invention has been implemented in view of the foregoing problem, and has an object to provide a magnetic tape drive apparatus and a magnetic head cleaning method which can prevent abrasion of a recording/reproducing head having a small allowable range to abrasion such as an MR head and also effectively remove deposit of the head due to deposition of stain or the like.

In order to attain the above object, a magnetic tape drive apparatus according to the present invention is characterized by comprising cleaning means for removing deposit such as stain adhering to a magnetic head to clean the magnetic head, error rate detection means for detecting the error rate of the magnetic tape when data are recorded/reproduced onto/from the magnetic tape, and error rate storage means for storing the error rate detected by the error rate detection means, wherein when the error rate detected by the error rate detection means is increased at a predetermined rate with respect to an error rate which is detected at any time point and stored, the magnetic head is cleaned by the cleaning means.

A magnetic head cleaning method according to the present invention is characterized in that a magnetic head is cleaned by cleaning means when the error rate of a magnetic tape being used is increased at a predetermined rate with respect to an error rate which is detected at any time point and stored.

Accordingly, deposit such as stain can be effectively removed, and excessive cleaning which induces abrasion of the magnetic head can be prevented.

DETAILED DESCRIPTION OF THE PREFERRED EMBODIMENTS

Preferred embodiments of a magnetic tape drive apparatus and a magnetic head cleaning method according to the present invention will be described hereunder with reference to the accompanying drawings. In the following embodiments, the present invention is applied to a video tape recorder of a helical scan system (hereinafter referred to as "VTR") which is an embodiment of a magnetic tape drive apparatus of the present invention.

Figure 1:
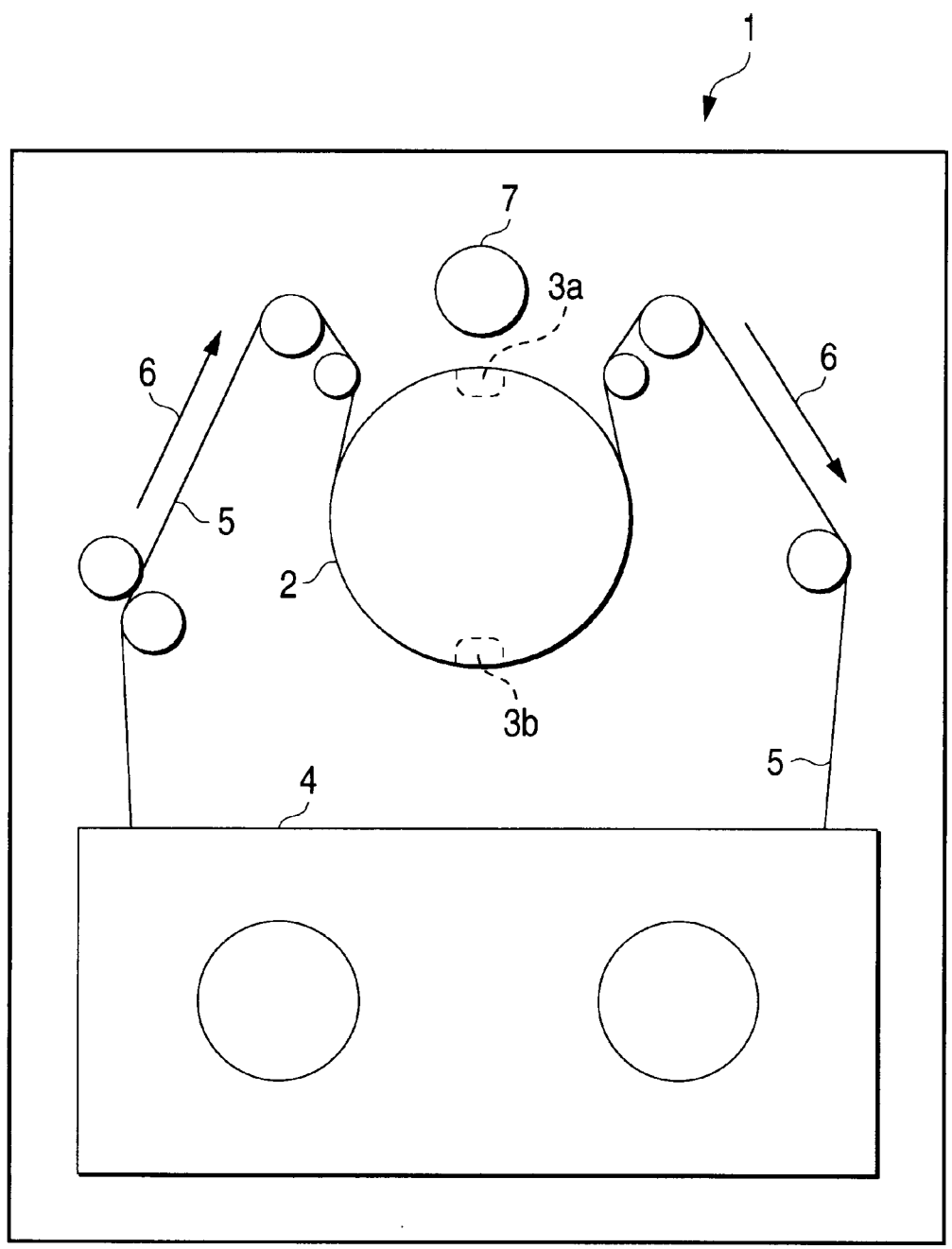
FIG. 1 is a schematic diagram showing the construction of VTR to which a magnetic tape drive apparatus and a magnetic head cleaning method of the present invention are applied.

As shown in FIG. 1, VTR 1 has a head drum 2, and magnetic heads 3a, 3b for recording/reproducing data on/from a magnetic tape (hereinafter referred to as "recording/reproducing heads") are disposed on the head drum 2 so as to be spaced away from each other at an angular interval, for example, of 180°. Each of the recording/reproducing heads 3a, 3b has a magneto resistive effect (MR effect) element as a magnetically sensitive portion in order to support a recording system of high recording density, and adopts a so-called MR head for converting magnetic variation on the magnetic tape into resistive variation of MR film and picking up the resistive variation as current variation.

When a tape cassette 4 is loaded into VTR 1, a magnetic tape 5 is hooked and drawn out from the housing of the tape cassette 4 by a loading post or the like, guided by a tape guide, a pinch roller, etc. and wound around the head drum 2 at a predetermined winding angle to form a tape path as shown in FIG. 1, and then it travels in the direction of an arrow 6 at a constant speed. The magnetic tape 5 travels along the outer circumferential surface of the head drum 2 while floated from the outer circumferential surface of the head drum 2 at a distance of several μm due to an air film effect which is caused by air current occurring due to the rotation of the head drum 2.

Cleaning means 7 is disposed so as to face a portion of the head drum 2 around which the magnetic tape 5 is not wound.

The cleaning means 7 has a well-known structure which is generally used at present. For example, it comprises a cleaning roller which is designed as a cylindrical contact member coming into contact with the recording/reproducing heads 3a, 3b and formed of suitable material. As described later, when it is judged that the recording/reproducing heads 3a, 3b are needed to be cleaned, the cleaning means 7 is moved so as to come into contact with the head drum 2 and the recording/reproducing heads 3a, 3b to clean these elements.

The mechanical construction of VTR 1 is substantially designed as described above. The cleaning control operation of the recording/reproducing heads 3a, 3b by using the cleaning means 7 will be described hereunder.

With respect to VTR 1, it is estimated that the increase (aggravation) of the error rate under use is almost caused by adhesion of deposit such as deposition of stain to the recording/reproducing heads 3a, 3b, and thus when an error rate being currently detected is increased at a predetermined rate with respect to an error rate which was detected at any time point and stored (hereinafter referred to as "reference error rate"), the recording/reproducing heads, 3b are cleaned with the cleaning means 7.

That is, when the tape cassette 4 is inserted into VTR 1, a data reproducing operation is first carried out on the tape cassette 4 to detect an error rate (initial error rate) regardless of whether the tape cassette 4 has not yet been used or has been already used or whether the reproducing operation is started from the head of the magnetic tape 5 or some midpoint of the magnetic tape 5, and the initial error rate is stored as a reference error rate. Thereafter, the reference error rate is compared with an error rate detected after the reference error rate is detected. As a comparison result, if it is judged that the subsequently detected error rate is increased at a predetermined rate with respect to the reference rate, the deposit such as the deposition of stain is judged to adhere to the recording/reproducing heads 3a, 3b, and then the cleaning operation is carried out with the cleaning means 7. If no data are recorded on the tape cassette 4, the reproduction is carried out to detect the error rate at the time point at which the data recording is started.

The flow of reproduction signals in the reproducing operation of VTR 1 and the detection of the error rate will be hereunder described.

Figure 2:
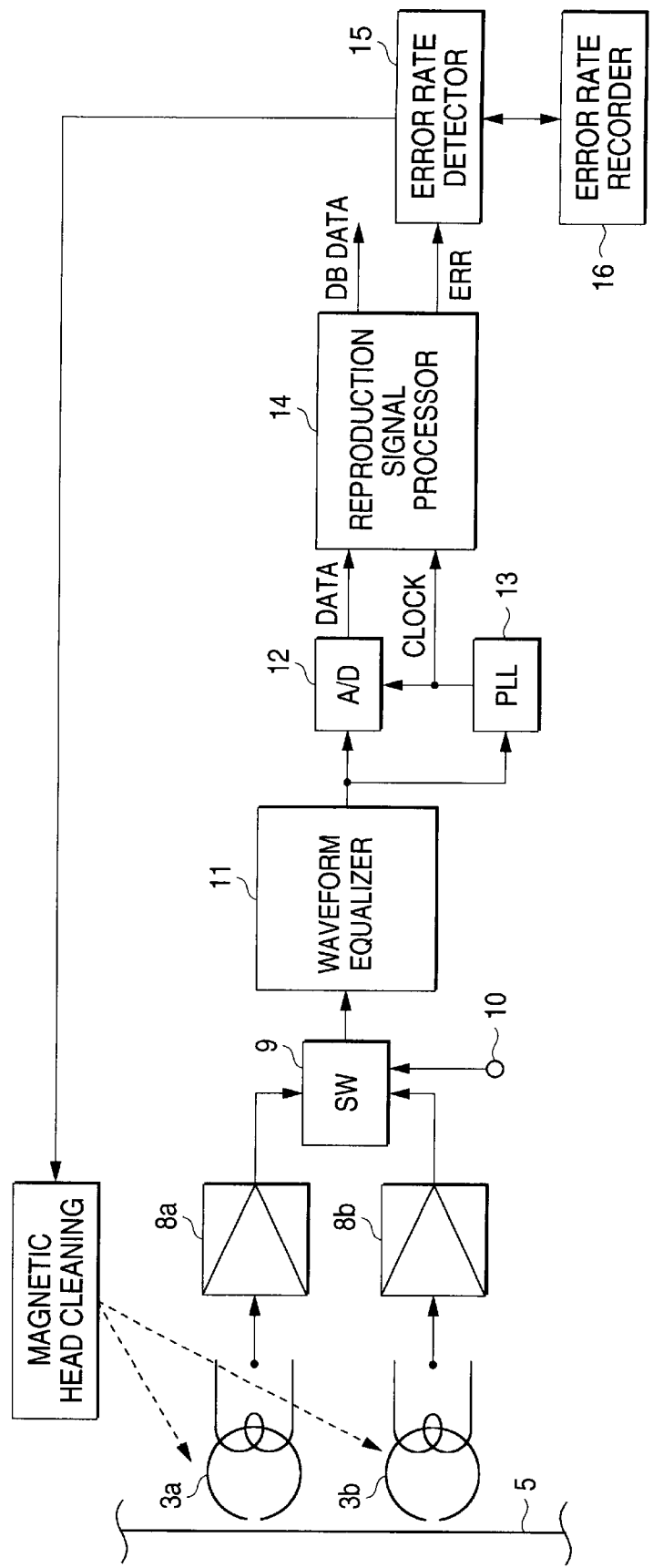
FIG. 2 is a block diagram showing the construction of a reproducing system of VTR.

That is, as shown in FIG. 2, reproduction signals which are read out from the magnetic tape 5 through the scanning operation of the recording/reproducing heads 3a, 3b are supplied through reproduction amplifiers 8a, 8b to a switching circuit 9. The switching circuit 9 is controlled in synchronism with the scanning operation of the recording/reproducing heads 3a, 3b on the basis of a switching pulse SWP from a terminal 10 to combine the reproduction signals into one channel signal, and the one channel signal thus combined is supplied to a waveform equivalent circuit 11. The output signal from the waveform equivalent circuit 11 is supplied to an analog/digital (A/D) converter 12 and PLL 13.

The output signal from the A/D converter 12 and a clock signal reproduced from PLL 13 are supplied to a reproduction signal processing circuit 14. The reproduction signal processing circuit 14 processes the reproduction signal to form reproduction data (video data, audio data, sub code data, etc.). The reproduction signal processing circuit 14 carries out error correction of the reproduction signal, shuffling in the signal recording operation, deshuffling, decoding of high-efficiency coding of video data, processing of audio data and sub code data, etc.

A reproduction signal (PB data) is obtained from the reproduction signal processing circuit 14, and also error data ERR serving as an error status signal is obtained from an error correction circuit (not shown) contained in the reproduction signal processing circuit 14. The error data ERR is supplied to an error rate detection circuit 15 serving as error rate detection means to calculate the error rate, and the value of the error rate thus calculated is stored into a memory 16 serving as error rate storage means. The error rate detection circuit 15 comprises a microcomputer, for example, and it controls the operation of the cleaning means 7.

In a case where VTR 1 is a magnetic tape drive apparatus for performing the recording operation and the reproducing operation independently of each other, in the data reproducing operation the error rate is continuously detected at all times, and the error rate detection circuit 15 compares the error rate thus continuously detected with the reference error rate stored in the memory 16. When it is judged on the basis of the comparison that the error rate is increased at a predetermined rate, for example, the error rate is increased to be twice as high as the reference error rate, the error rate detection circuit 15 instructs the cleaning means 7 to clean the recording/reproducing heads 3a, 3b.

Even in the data recording operation, recorded data are reproduced and the error rate is detected periodically every fixed time interval or every time some condition is satisfied or the like, and the error rate detection circuit 15 compares the error rate thus periodically detected with the reference error rate stored in the memory 16. When the error rate is increased at a predetermined rate, for example, at the time point when the error rate is increased to be twice as high as the reference rate, the error rate detection circuit 15 instructs the cleaning means 7 to clean the recording/reproducing heads 3a, 3b. The reproducing operation which is carried out to detect the error rate during the recording operation is preferably reduced insofar as the power consumption is permitted.

Further, in a case where VTR 1 adopts a system for performing both the data recording operation and the data reproducing operation at the same time, that is, VTR 1 is a magnetic tape drive apparatus for carrying out a so-called read-after-write (RAW) operation, the reproduction is carried out even in the data recording operation, and the error rate is detected at all times.

The error rate detection circuit 15 compares the error rate thus continuously detected with the reference error rate stored in the memory 16, and at the time when the error rate is increased at a predetermined rate, for example, at the time when the error rate is increased to be twice as high as the reference error rate, the error rate detection circuit 15 instructs the cleaning means 7 to clean the recording/reproducing heads 3a, 3b.

In each type tape drive apparatus described above, if the error rate is not improved by only one cleaning operation of the cleaning means 7, the above operation is repeated.

In VTR1 thus constructed, the reference error rate of the tape cassette 4 (magnetic tape 5) being used, for example, the initial error rate is stored, and the degree of deposit of the recording/reproducing heads 3a, 3b is estimated on the basis of the difference between the value of the initial error rate and the current error rate, whereby the dispersion between tape cassettes (magnetic tapes) being used can be canceled.

That is, a more optimum judgement can be made on the deposit of the recording/reproducing heads 3a, 3b by individually varying the reference error rate serving as the judgement criterion in accordance with the type of the magnetic tape 5 (the difference in magnetization characteristic, material of magnetic substance or the like) or the difference in individuals. This is based on the system of VTR 1 in which when the tape cassette 4 is inserted, the data reproduction is first carried out to detect the error rate (initial error rate) regardless of whether the tape cassette 4 is non-used or has been used or whether the reproduction operation is started from the head of the magnetic tape 5 or from some midpoint thereof, and the initial error rate thus detected is stored as the reference error rate. If data are already written on the tape of the cassette, the initial error rate is detected by reading the data when the tape cassette is loaded. If the cassette is a blank cassette, some data are written when the cassette is loaded and initial error rate is detected by reading the data.

On the other hand, in a case where the error rate value on the basis of which the recording/reproducing heads 3a, 3b are cleaned with the cleaning means 7 is fixed for each apparatus, when a tape cassette 4 being used has a very small error rate, a larger amount of deposit such as stain than expected has already adhered to the recording/reproducing heads 3a, 3b at the time when it is judged that the recording/reproducing heads 3a, 3b are needed to be cleaned, and thus there falls into such a situation that it is difficult to remove the deposit by even the cleaning operation of the cleaning means 7. Further, in a case where a tape cassette 4 which originally has a bad (large) error rate is used, the cleaning operation is carried out by the cleaning means 7 with slight deterioration (increase) of the error rate even when the recording/reproducing heads is slightly deposited or is never deposited, so that the abrasion of the recording/reproducing heads 3a, 3b is promoted, etc. Therefore, the recording/reproducing heads 3a, 3b are more damaged than expected.

This is more important particularly when VTR1 is a lower-class model or it is required to be compatible with other formats because the optimum tape cassette may not be used.

Accordingly, in order to avoid the above problem, in VTR 1, the reference error rate at any time point is detected and stored, and when an error rate which is periodically detected is increased at a predetermined rate with respect to the reference rate, it is judged that the recording/reproducing heads 3a, 3b are deposited with stain or the like, and thus the cleaning operation is carried out by using the cleaning means 7.

No restriction is imposed on the structure and system of the cleaning means 7 used in VTR 1, and all well-known parts such as a cleaning roller may be used.

As described above, in VTR 1, an error rate serving as a judgment criterion on the adhesion of deposit to a magnetic head is measured and stored as a reference error rate every magnetic tape being used, and the reference error rate thus detected is compared with the error rate detected at the current time point to detect that the error rate is actually deteriorated due to the deposit of the recording/reproducing head every magnetic tape being used. Accordingly, a misjudgment can be prevented from being made on the deposit of the recording/reproducing heads due to the dispersion of the error rate which is originally owned by the magnetic tape being used, and thus the deposit of the magnetic head can be surely removed. As a result, there can be obtained a magnetic tape drive apparatus in which the abrasion of a recording/reproducing head can be suppressed at maximum and the deposit of the recording/reproducing head can be effectively removed even when an MR head having a small allowable range to abrasion is used as the magnetic head.

The recording/reproducing head used in the tape drive apparatus of the present invention is not limited to the MR head. Further, when the deposit of the recording/reproducing head is detected through the above process, simultaneously with the deposit removing operation of the cleaning means, a message indicating the deposit detection may be displayed or warning such as alarm may be given.

The shape and structure described in the above embodiment are merely shown as examples to implement the present invention, and thus the subject matter of the present invention should not be limitedly interpreted on the basis of these examples.

As described above, according to the present invention, the magnetic tape drive apparatus in which data are recorded/reproduced on/from a magnetic tape by a recording/reproducing magnetic head which is disposed on a head drum and moved on a circular locus comprises cleaning means for removing deposit such as stain adhering to a magnetic head to clean the magnetic head, error rate detection means for detecting the error rate of the magnetic tape when data are recorded/reproduced onto/from the magnetic tape, and error rate storage means for storing the error rate detected by the error rate detection means, wherein when the error rate detected by the error rate detection means is increased at a predetermined rate with respect to an error rate which is detected at any time point and stored, the magnetic head is cleaned by the cleaning means. Therefore, the error rate serving as the judgment criterion on the adhesion of deposit to the magnetic head is measured and stored as a reference error rate every magnetic tape being used, and the reference error rate is compared with an error rate which is detected at a current time point, whereby it can be actually detected that the error rate is deteriorated due to the deposit of the recording/reproducing head. In addition, the misjudgment on the deposit of the recording/reproducing head due to the dispersion of the error rate which the magnetic tape being used originally has can be prevented, and thus the deposit of the magnetic head can be surely removed.

According to the present invention, the head using a magnetoresistive effect element as a magnetically sensitive portion is used as the magnetic head, and thus a recording system of high recording density can be used.

According to the present invention, the error rate is periodically detected in the data recording operation, and thus when the magnetic head is deposited, the deposit can be quickly removed.

According to the present invention, the data reproducing operation is carried out during the data recording operation to detect the error rate, so that the magnetic head can be always kept not to be contaminated with the deposit such as stainless.

Further, according to the magnetic head cleaning method of the invention for cleaning the magnetic recording/reproducing head which is disposed on the head drum and moved on a circular locus, the error rate of the magnetic tape being used is detected at any time point and stored, and when the error rate thus detected is increased at a predetermined rate with respect to the reference error rate stored, the magnetic head is cleaned by using the cleaning means.

Therefore, when this method is applied to the magnetic tape drive apparatus, an error rate serving as a judgment criterion on the adhesion of deposit to the magnetic head is measured and stored as a reference error rate every magnetic tape being used, and this reference error rate is compared with the error rate detected at the current time point, whereby it can be detected every magnetic tape being used that the error rate is actually deteriorated due to the deposit of the recording/reproducing head. In addition, a misjudgment on the deposit of the recording/reproducing head can be prevented from occurring due to the dispersion of the error rate that the magnetic tape being used originally has, and thus the deposit of the magnetic head can be surely removed.

What is claimed is:

1. A magnetic tape drive apparatus in which data are recorded/reproduced on/from a magnetic tape by a recording/reproducing magnetic head which is disposed on a head drum and moved on a circular locus, comprising:

cleaning means for removing deposit such as stain adhering to said magnetic head to clean said magnetic head;

error rate detection means for detecting the error rate of said magnetic tape when data are recorded/reproduced onto/from said magnetic tape; and error rate storage means for storing the error rate detected by said error rate detection means, wherein, said apparatus is configured such that said error rate detection means detects an initial error rate when said magnetic tape is first loaded into said apparatus and stores said initial error rate as a reference error rate in said error rate storage means, said apparatus is configured to detect a subsequent error rate after said initial error rate is detected; and said apparatus is configured such that when the subsequent error rate detected by said error rate detection means is determined to have exceeded said reference error rate by a threshold amount, said magnetic head is cleaned by said cleaning means.

2. The magnetic tape drive apparatus as claimed in claim 1, wherein said magnetic head comprises a magnetoresistive effect element as a magnetically sensitive portion.

3. The magnetic tape drive apparatus as claimed in claim 1, wherein the subsequent error rate is periodically redetected in a data recording operation.

4. The magnetic tape drive apparatus as claimed in claim 1, wherein in a data recording operation a data reproducing operation is simultaneously carried out to detect the subsequent error rate.

5. The apparatus of claim 1, wherein said error detection means is configured to detect an error rate based at least in part on a detectable characteristic of said magnetic tape.

6. The magnetic tape drive apparatus of claim 1, wherein said apparatus is configured to allow substitution of another error rate for said initial error rate as said reference error rate.

7. A magnetic head cleaning method for cleaning the magnetic head which is disposed on the head drum and moved on a circular locus, said method comprising the steps of:

(a) detecting an initial error rate when a magnetic recording tape is loaded into said apparatus;

(b) storing said initial error rate as a reference error rate;

(c) detecting a subsequent error rate after detecting said initial error rate and comparing said subsequent error rate to said reference error rate; and (d) cleaning said magnetic head when said subsequent error rate exceeds said reference rate by a threshold amount.

8. The method of claim 7, wherein steps (c)–(d) are performed periodically.

9. The method of claim 7, wherein step (d) comprises cleaning said magnetic head when said subsequent error rate exceeds said reference rate.

* * * * *